Jan. 20, 1942.   C. E. MEYERHOEFER   2,270,824
HEATER
Filed May 3, 1939   3 Sheets-Sheet 1

INVENTOR
Carl E. Meyerhoefer
BY
ATTORNEYS

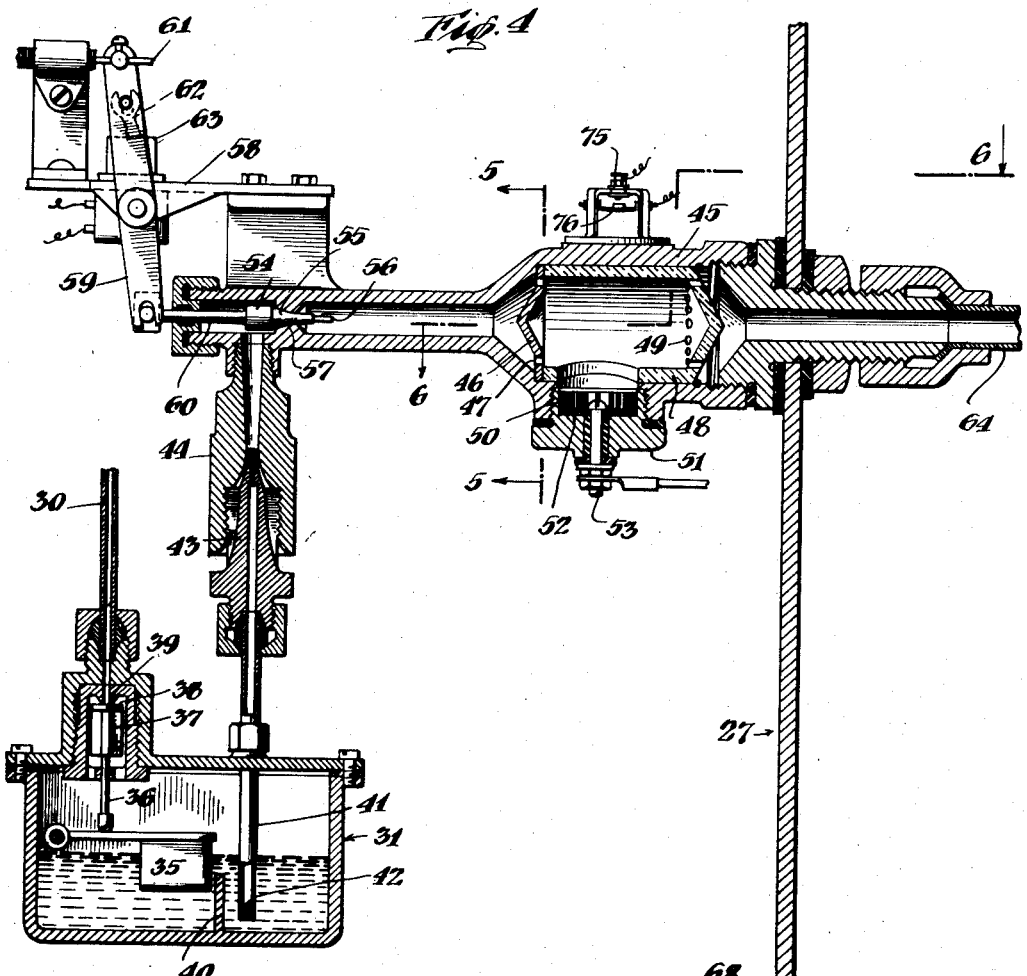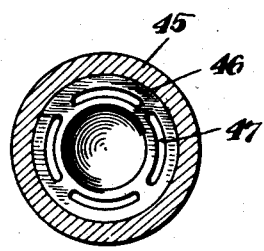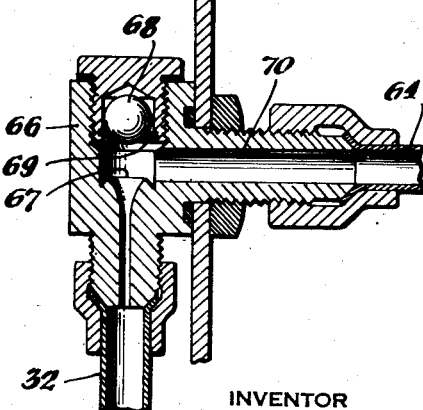

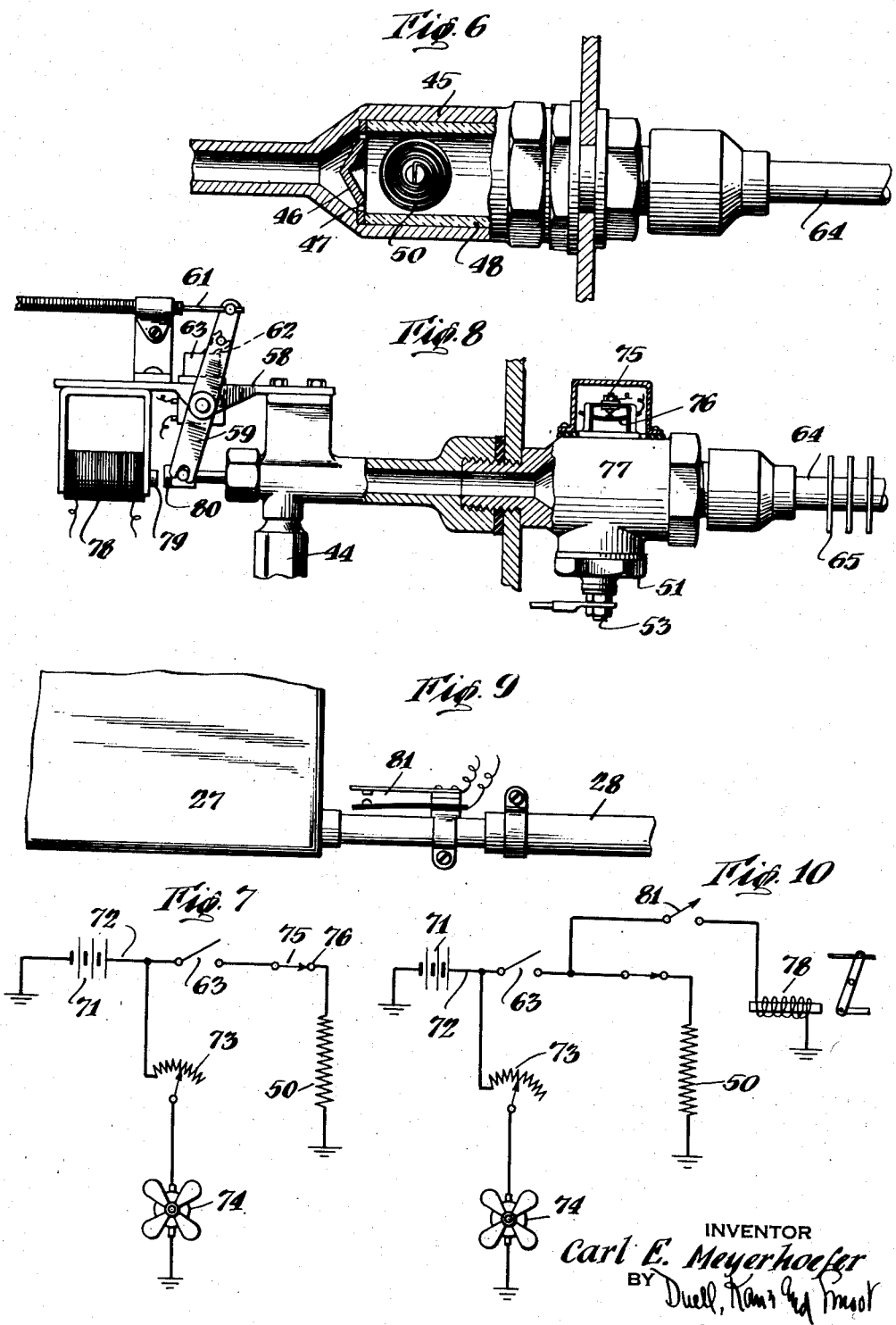

Patented Jan. 20, 1942

2,270,824

UNITED STATES PATENT OFFICE 2,270,824

HEATER

Carl E. Meyerhoefer, Brooklyn, N. Y., assignor to E. A. Laboratories, Inc., Brooklyn, N. Y., a corporation of New York Application May 3, 1939, Serial No. 271,560

11 Claims. (Cl. 237—2)

This invention relates to a structurally and functionally improved heater capable of use in numerous different associations but primarily intended for employment in connection with a motor vehicle and in which it is desired—for example—to heat the passenger compartment. This application is a continuation in part of my earlier application Serial No. 266,749 on Heater, filed in the United States Patent Office April 8, 1939.

It is a well appreciated fact that objections have been encountered in connection with heaters for use in motor vehicles and where, for example, a core has been connected to the engine cooling system in order to be heated by the water in that system, and where an air impelling mechanism has been associated with the core and within the passenger compartment of the vehicle for causing air to move in heat exchange contact with the core and to be distributed as desired throughout the compartment. More particularly, one of the major objections which has occurred is that with the motor cold, quite a few minutes have elapsed between the motor being started and the temperature of the water within the core reaching a sufficiently high point to warm the interior of the vehicle. This is despite the fact that thermostats have been commonly employed to limit the water flow through the engine cooling system until the temperature of the water has reached a satisfactory and predetermined point.

Thus, it is an object of the present invention to provide an apparatus which will enable the heater within the passenger compartment to function in a very short interval of time after heat is desired. At the same time, the present invention will not require any modification or reconstruction of the heater within the compartment. Accordingly, units of this type and as heretofore constructed may be employed without it being necessary to repurchase a new and special type of passenger compartment heater in order to have the benefits of the present teachings.

A further object of the invention is that of furnishing a heating apparatus capable of use in numerous different associations but primarily intended to be employed in connection with a motor vehicle and which may readily be installed by a relatively unskilled mechanic and which will function with entire satisfaction over long periods of time, and while so functioning will contribute somewhat to increased efficiency of operation on the part of the motor which drives the vehicle.

A still further object is that of furnishing a unit of this type and which may be located outside the passenger compartment so that it will be removed to a maximum extent from contact with users of the vehicle and dangers to such users will be correspondingly minimized.

Another object is that of furnishing a unit of this type and in which if—due to some unforeseen failure of certain of the apparatus—a dangerous condition is presented, the heater will forthwith become inoperative before such condition has reached a critical point. Consequently, damage to the apparatus and danger to the occupants of the vehicle will be further guarded against; and the present invention also contemplates that when the apparatus is once rendered inoperative, it may readily be again made operative with minimum effort and expense after the condition contributing towards danger has been rectified.

An additional object is that of providing a heater unit and in which combustion will be initiated and maintained in an extremely efficient manner. Accordingly, the heater will function almost instantaneously after the operator desires to initiate its functioning, and even although the temperature of the heater surfaces may be extremely low.

Still another object is that of furnishing a unit of this type which will embody relatively few parts, each individually simple and rugged in construction, such parts being capable of ready manufacture and assemblage according to quantity production methods, to provide for a compact arrangement of apparatus which may be sold at a relatively nominal figure.

With these and other objects in mind, reference is had to the attached sheets of drawings illustrating practical embodiments of the invention and in which:

Fig. 4 is an enlarged sectional side view showing in detail certain of the apparatus illustrated in Figures 1 and 2;

Fig. 5 is a transverse sectional view taken along the lines 5—5 and in the direction of the arrows as indicated in Fig. 4;

Fig. 6 is a partly sectional plan view taken along the lines 6—6 and in the direction of the arrows as also indicated in Fig. 4;

Fig. 7 shows the wiring circuit preferably forming a part of the foregoing apparatus;

Fig. 8 is a partly sectional side view of a construction slightly different from that shown in Fig. 4;

Fig. 9 is a fragmentary side elevation illustrating the mounting of a thermostatic switch such as is preferably employed; and Fig. 10 illustrates a further wiring diagram which will be used in connection with apparatus as shown in Figs. 8 and 9.

In these views as well as in the following description, it will be obvious to those skilled in the art that an apparatus has been described which is of particular utility when employed in connection with a heater which is to be used to warm a given space and which heater is of the liquid type. This is subject to an exception as will hereinafter appear, such exception contemplating a heater which will, for example, directly warm air which in turn is discharged into a given compartment or space. An apparatus which is primarily dedicated to a unit of the latter type is embodied in my previously filed application for patent dated April 8, 1939, Serial No. 266,749.

Figure 1:
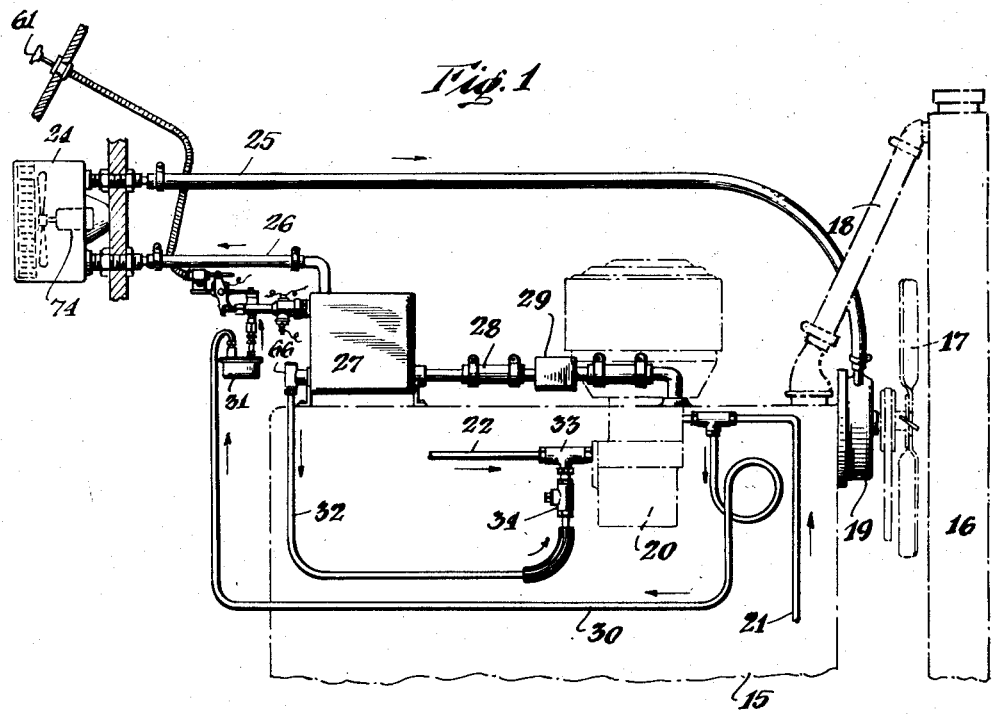
Fig. 1 is a side elevation of a motor vehicle with the heater associated therewith.

Thus, referring primarily to Figure 1, the numeral 15 indicates a motor block provided with the usual cooling system including a radiator 16 through which air is drawn by a fan 17 and which radiator is coupled to the block by, for example, a hose 18. Moreover, this system conventionally includes a water pump 19 which assures a proper circulation of the motor cooling liquid and it will additionally be understood that a further coupling (not shown) exists preferably between the base of the block 15 and the lower end of radiator 16.

The motor has an intake manifold through which a combustible mixture flows to the motor cylinders from a carburetor 20. Fuel is supplied to the latter by means of a line 21 and the intake manifold may be tapped by line 22 conveniently extending to the windshield wiper motor (not shown) in order that the latter may be coupled to a source of vacuum.

As afore brought out, the present invention is particularly intended for use in connection with motor vehicles and wherein it is desired to heat the passenger compartment. With this thought in mind, the invention has been illustrated accordingly. Thus, the motor as afore described has been illustrated and it will moreover be noted that a dash or partition is provided which segregates the motor from the space within which the heater 24 is disposed. This heater may take numerous different forms including, for example, the structure shown in my prior United States Patent No. 2,087,160 of July 13, 1937.

However, instead of conventionally connecting the heater 24 to the cooling system of the motor vehicle, it will be observed that where the present invention is employed in this association, the upper head or connection of the heater may be coupled by a tube 25 directly with the water pump 19, while the lower head or connection of this heater, is coupled to a hose 26. This hose is in turn connected to a casing 27 and the latter is coupled to the block 20 by means of a tube 28 within which there is preferably interposed a thermostatic valve 29. This valve—for purposes hereinafter brought out—will, for example, be substantially closed until a temperature of 110° F. is reached and will respond to higher temperatures to a point at which it is fully open which again, for example, may be at 140° F.

Now, considering the structure associated with casing 27, it will primarily be noted that a pipe 30 may have one of its ends connected to the fuel supply line 21, its opposite end being coupled to a float chamber or casing 31, in turn connected to casing 27, while a pipe 32 has one of its ends coupled to casing 27, its opposite end being connected to intake manifold 19. The latter connection may conveniently be made by coupling the discharge end of pipe 32 to pipe 22 by means of a suitable fitting 33. Also, at a point short of this fitting, a valve assembly 34 may be connected to pipe 32. This assembly is conveniently of a type such that the vacuum within the pipe will never exceed a predetermined point.

Now especially considering Figure 4 it will be observed that within casing 31 a float 35 is positioned to have movement. This float acts against a stem or rod 36 provided with ribs or radial guide flanges 37 and mounting a valve body 38 cooperative with a seat 39 formed adjacent the intake end of casing 31. A partition 40 may extend upwardly from the base of casing or chamber 31 and to one side of this partition a discharge pipe 41 may be mounted. The flow of liquid through this pipe is restricted and regulated by reducing the intake end of the same. This may conveniently be achieved by mounting a metering plug 42 adjacent the intake end of pipe 41. The upper end of the pipe at a point beyond the casing 31 is coupled to a carburetor structure including, for example, a nozzle 43 which has associated with it a Venturi member 44 having its lower edges spaced from member 43 so that air may be drawn past the upper end of the nozzle and thus provide a combustible mixture.

Connected to this charge forming device is a combustion chamber which may conveniently include a chamber 45 having an intake end defined by a plate 46 which is preferably metal and of cup shape and is formed with a series of arcuate slots 47. The combustion chamber has applied to its inner face, a layer or liner 48 which may be of ceramic material and is provided with a base portion formed with an annular series of perforations 49. The shell defining chamber 45 is preferably formed with a well or recess within which there is disposed a coiled strip 50 of resistance material. This material or ribbon is mounted by, for example, being secured to a plug 51 having screw-threaded engagement with an extension forming a part of the shell which defines casing 45. The strip 50 may have one of its ends connected or grounded to the plug 51, its body being insulated by a layer of dielectric material 52 from the plug and its opposite end being connected to a stud 53 extending beyond the plug. As also shown in Figure 6, the liner 48 is interrupted in line with the resistance coil or ribbon so that it may act on a combustible mixture passing through the chamber defined by shell 45.

Interposed between the carburetor assembly 43—44 and the combustion chamber, is a control valve including, for example, a body 54 having a tapered forward extension 55 and a reduced end portion 56. The latter—when the valve is in open position—bears in guiding relationship with the opening defined by the seat 67. This seat with the valve in closed position, is engaged by the tapered forward end portion 68 to assure a complete interruption of fluid flow from the carburetor to the combustion chamber. A bracket 58 may be secured to this portion of the mechanism and mount a lever 59 which has one of its ends secured to the stem 60 of the valve, its opposite end being secured to a control 61 which is shown in Figure 1, may extend into the passenger compartment of the vehicle so that it may be shifted by the operator. Also, before departing from a consideration of this particular structure, it will be noted that lever 59 is connected to the operating arm 62 of a conventional "snap" switch 63.

Figure 2:
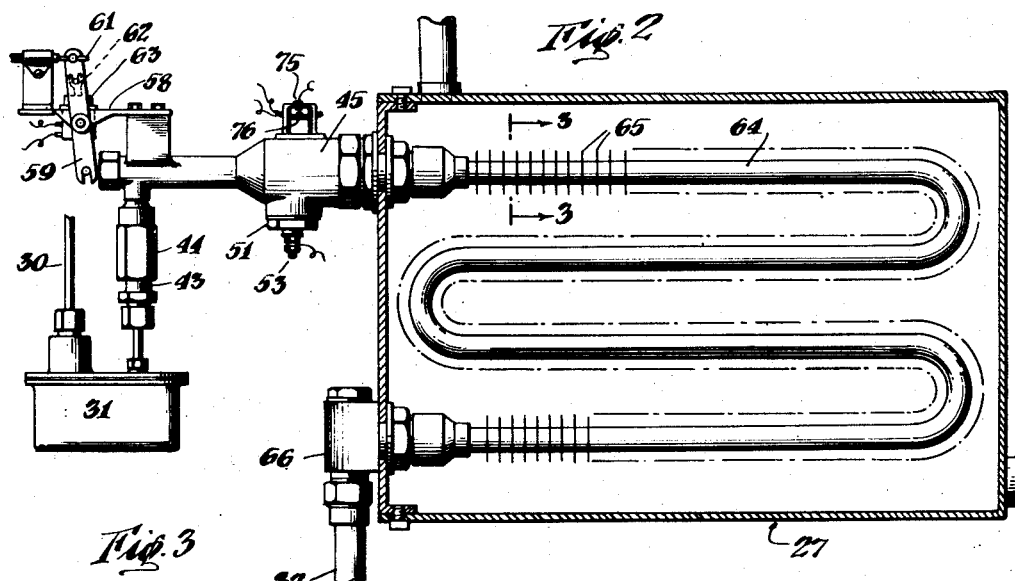
Fig. 2 is a somewhat enlarged sectional side view showing the interior construction of the heater unit.
Figure 3:
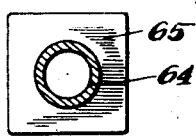
Fig. 3 is a transverse sectional view taken along the lines 3—3 and in the direction of the arrows as indicated in Fig. 2.

As shown in Figures 1 to 6, the combustion chamber as defined by casing 45, is preferably located wholly outside of casing 27. The discharge or exhaust end of this chamber is coupled to a heat exchange structure disposed within casing 27 and this structure, as shown in Figures 2 and 3, may simply include a tube 64 having its intake end coupled to the combustion chamber and its body mounting a series of heat radiating and dissipating fins or elements 65. The outlet end of pipe 64 is coupled to pipe 32 by means of an intermediate fitting 66 and it is accordingly obvious that the products of combustion will flow from the heat exchange structure through to the intake manifold at which point they will intermingle with the fuel charge flowing towards the cylinders of the motor in order to "dry" such incoming charge and to cause the components thereof to more intimately co-mingle to provide a more homogeneous mixture.

Disposed within fitting 66 is what might be termed a safety valve which under certain circumstances will serve to interrupt a flow of fluid towards the intake manifold. The structure preferably employed is shown in Figure 4 in which it will be seen that a valve seat is indicated at 67, such seat being engageable by a valve 68. This valve is normally held in inoperative position by for example, a fusible washer or ring 69, but is constantly potentialized to engage the seat 67 in the event that the washer 69 should be removed, or be rendered inoperative. At this time it will also be noted that fitting 66 may conveniently include a Venturi passage 70 which will "even-out" the flow of products of combustion as they pass toward the intake manifold. In fact it is to be noted that with such a structure present, the valve assembly 34 may be dispensed with.

Now considering Figure 7 it will be noted that the numeral 71 indicates a source of electric energy such as the battery of the car, which may have one of its terminals grounded. A lead 72 extends from this source and is coupled, for example, to a rheostat switch 73 connected to the motor 74 of the heater 24. Consequently, the air impelling mechanism coupled to this motor may function at the will of the operator and at any desired speed. Switch 63 is disposed in a branch of lead 72 and is in turn coupled to a thermostatic switch indicated in Figure 7 by the numeral 75, which is finally connected to the coil or ribbon 50.

The thermostatic switch 75 may be of any desirable construction but when cool, should be closed and should open automatically upon the temperature of the casing 45 defining the combustion chamber reaching a predetermined degree. Preferably this thermostatic switch should be of the "snap" type as illustrated in Figure 4, including, for example, a central terminal 76, and a flexion disc 76 carrying a similar terminal for engagement with terminal 75. The construction of switches of this character is well known to those skilled in the art, it being appreciated that they have the characteristic of being either wholly closed or completely open, according to the temperature to which they are subjected.

It is believed that before considering the application of the foregoing structure, it is wise to take into consideration the structure and circuit included in Figures 8, 9, and 10. In the first of these views the numeral 77 indicates the casing which provides the combustion chamber as afore described. Instead of being positioned exteriorly of the housing or casing 27 as shown in the preceding views, this element in Figure 8 is disposed within such housing. As shown it is obvious that this particular structure would probably not be suitable if water or other liquid is flowed through the casing 27 unless both the thermostat 75—76 and the terminal 53 were encased so as not to be contacted by the liquid. However, as shown the structure is entirely useable in connection with other fluid, such as air, and particularly where a heater such as is disclosed in my prior application is employed. A structure such as this is obviously advantageous in that the fluid flowing through casing 27 will move in contact with the exterior surfaces of the combustion chamber 77 and be heated so that unnecessary losses will not occur; this being aside from the fact that by means of such a structure the combustion chamber will be rendered inaccessible, and the temperature of its exterior surfaces will be reduced.

With respect to the remaining construction shown in this figure, it will be noted that there has again been shown the control 61 coupled to the lever 59 which in addition to operating switch 63 serves also to move the valve stem 60. However, in this view, a solenoid 78 is employed which has its armature disposed in line with an extending portion 80 of stem 60. This solenoid is arranged in series with a thermostatic switch 81 as shown in Figures 9 and 10, it being understood that switch 81 under low temperatures is open, but will close when, for example, a temperature of 175° F.–180° F. is reached. As shown in these figures this switch is preferably mounted upon the tube 28 so that it will properly respond to the temperature of the fluid passing therethrough. Referring especially to Figure 10, it is to be observed that the lead extending to switch 81 is coupled to the lead which energizes coil 50 and to the rear of switch 63. Accordingly as long as the latter switch is closed, solenoid 78 will remain de-energized until the critical temperature is reached whereupon this solenoid will be energized. Thereupon if control 61, as shown in Figure 8, has been actuated to cause an opening of the valve coupled to stem 60, the armature 79 will forcibly contact the head 80 of stem 60 and shift the valve coupled to the latter to closed position. Simultaneously, it will rock lever 59 to move switch 63 to open position and it will return control 61 to inoperative position.

Now considering the operation of the mechanism as heretofore described, it will primarily be assumed that this mechanism has been associated with a motor vehicle and that the connections as particularly shown in Figure 1 have been established. Moreover, it will be assumed that the motor 15 is operating so that, first, fuel is flowing through line 21 and suction exists within the intake manifold. If now the operator shifts control 61, he will close switch 62 and simultaneously open valve 54. The closing of the switch will immediately result in an energization of coil 50. The opening of the valve will establish a suction within the carburetor structure such that a fuel charge is formed and this will enter the combustion chamber. Within such chamber it will be ignited and the highly heated products of combustion will flow through tube 64 and be exhausted through fitting 66 and pipe 32.

Now, it will be understood that when the operation of the motor 15 was initiated, the fluid within the same was cold. Obviously if this fluid were passed without impediment through the casing 27 to the heater 24, a considerable period of time would still elapse before the air discharged incident to operation of motor 74 would be heated. It is with this thought in mind that thermostatic valve 29 is provided. This valve will be closed under these circumstances and, for example, only one pound of water per minute will flow through the same. Therefore, the flow of highly heated products of combustion through tube 64, or any equivalent heat exchange structure, will rapidly raise the temperature of the water, and the casing 27 being adjacent heater 24, the temperature of the core of the latter heater will be quickly raised.

With the motor 15 continuing to operate, the temperature of the water flowing towards casing 27 through thermostatic valve 29 and coupling 28 will continue to gradually rise. In this connection it will be understood that the motor will ordinarily be provided with one or more additional thermostatic valves (not shown) in its cooling system and which will prevent the water from flowing directly to the radiator 16. Now, if the temperature of the water flowing through valve 29 reaches, for example, 110° F., this valve will begin to open and the volume of flow will constantly increase until the temperature of the water reaches, for example, 140° F., at which time the valve will be fully opened. Under such circumstances there may be flowing through casing 27, twenty-nine pounds of water per minute. This, however, will not be objectionable because the temperature of the water so flowing will be sufficiently high that the heater 24 will function in a satisfactory manner.

Returning again to a consideration of the starting conditions and when the operation of motor 15 has just been initiated, it will be understood that the temperature of the surfaces within the combustion chamber may be extremely low. Accordingly, the mixture drawn from the carburetor assembly would ordinarily not "flash" because the flow of this mixture in conjunction with the chilled condition of the surfaces adjacent the ignitor structure will result in such low temperatures that the desired result will not be achieved. However, due to providing the valve 54 adjacent the entrance end of the combustion chamber, these difficulties will be overcome, especially if the stabilizing valve 34 is dispensed with. More particularly with motor 15 operating and valve 54 closed, a condition of vacuum will be transmitted through pipe 32 and this condition will maintain through to valve seat 57. The vacuum may approximate, for example, twenty-two inches. Now with gasoline having predetermined boiling and "flash" points, under atmospheric pressures, it will be found that the greater the vacuum, the lower will be these points. When the valve 54 is opened and mixture begins to flow, the vacuum condition will not be relieved forthwith due to the proportion of the parts and the relative sizes of the several passages. Rather, there will occur within the combustion chamber a drop in the number of inches of vacuum over an appreciable period of time and until the vacuum condition reaches a substantial stable point (for example five inches). During this interval and while the vacuum is relatively high, the coil will have reached a temperature such that ignition will result and thus, even with very low temperatures no difficulties will be experienced.

Obviously, when the combustion chamber has reached a temperature such that combustion will be maintained even if the igniting element becomes inoperative, it will be unnecessary to continue the drain imposed upon the battery by the igniting element. It is with this thought in mind that thermostatic valve 63 has been provided in that the temperature of the combustion chamber upon which switch is mounted will cause the latter to assume an open position to thus disconnect the battery from the coil 50.

Either at the initiation of the operation of the apparatus or some time subsequent thereto, rheostat switch 63 will be actuated by the operator to cause an operation of fan motor 74. It is to be assumed that after the motor 15 has been operating for a sufficient length of time, the operator will realize that an operation of what might be termed the "booster" heater assembly may be discontinued. This may be achieved by simply opening switch 63, by means of control 61 which will result in the suction through the apparatus being interrupted. If, however, the operator maintains the mechanism in a functioning condition, no damage to the parts will occur and the water discharged through pipe 26 will simply be superheated and may, in fact, be transmitted to a greater or lesser extent in the form of steam.

If, for example, due to some unforeseen condition, the flow of water through casing 27 is interrupted, it will be apparent that a dangerous condition might result because the heat transfer structure would not be cooled. To prevent any damage to the parts or injury to the persons adjacent the same, the valve 68, or its equivalent, is provided. More especially, it will be apparent that if the temperature of the gases flowing from the discharge end of pipe 64 reaches a sufficiently high point, the ring 69, or its equivalent, will be melted and the valve will drop to its seat 67. Under such circumstances the suction through tube 64, the combustion chamber, and carburetor will be interrupted and the apparatus will cease to function.

The purpose of disposing the combustion chamber 77 within casing 27 as shown in Figure 8 has heretofore been discussed especially in connection with air type heaters as described in my previously filed application. Likewise, the solenoid and thermostatic switch 81 are preferably employed in connection with a liquid type heater and are provided for the purpose of interrupting the heat transfer action by coil 64 when the temperature of the water flowing from the motor 15 once reaches a sufficiently high point. More especially it will primarily be understood that switch 81 might, for example, be of the type shown at 75 and 76, but regardless of this feature, this switch will close when the temperature of the water flowing into casing 27 once reaches a sufficiently high point. When this occurs and as is shown in Figure 10, solenoid 78 is energized to cause armature 79 to shift the valve coupled to stem 60 to closed position. Simultaneously control 61 will be returned to its initial position. This position will be maintained incident to the provision of arm 62 of the "snap" switch 63 which by virtue of its failure to maintain a dead-center position, will assist in maintaining the valve in either wholly closed or wholly opened positions. This, of course, is also true of the structure shown in Figure 4.

Returning to Figure 8, it will, of course, additionally be understood that the shifting of lever 59 will return the armature 79 to its initial position.

Thus, it is obvious that among others the several objects of the invention as specifically afore enumerated are achieved. It is also apparent that numerous changes in construction and rearrangement of the parts might be resorted to without departing from the spirit of the claims.

I claim:

1. A heating apparatus for application to a motor vehicle and including in combination, a tube to be connected to the fuel supply pipe of the automobile, a further tube to be connected to the intake manifold of the automobile engine, a carbureter connected to said first named tube, means providing a combustion chamber coupled to said carbureter, a heat exchange element providing a passage between said combustion chamber and said further tube, a casing formed with inlet and outlet openings, and enclosing said element and combustion chamber, means for igniting fuel within said combustion chamber, and a valve for preventing all flow through said further tube and heat exchange element, said valve being interposed between said combustion chamber and carbureter, whereby the vacuum created by the motor and transmitted through the further tube will—with the valve closed—extend through the combustion chamber to thereby assist in the ready ignition of the combustible mixture within the same as said valve is opened.

2. A heating apparatus for application to a motor vehicle and including in combination, a tube to be connected to the fuel supply pipe of the automobile, a further tube to be connected to the intake manifold of the automobile engine, a carburetor connected to said first named tube, means providing a combustion chamber coupled to said carbureter, a heat exchange element providing a passage between said combustion chamber and said further tube, a casing formed with inlet and outlet openings and enclosing said element, means for igniting fuel within said combustion chamber, a valve for preventing all flow through said further tube and heat exchange element, said valve being interposed between said combustion chamber and carbureter, whereby the vacuum created by the motor and transmitted through the further tube will—with the valve closed—extend through the combustion chamber to thereby assist in the ready ignition of the combustible mixture within the same as said valve is opened, and means responsive to the temperature of fluid entering the inlet opening of said casing for automatically closing said valve.

3. A heating apparatus for application to a motor vehicle and including in combination, a tube to be connected to the fuel supply pipe of the automobile, a further tube to be connected to the intake manifold of the automobile engine, a carbureter connected to said first named tube, means providing a combustion chamber coupled to said carbureter, a heat exchange element providing a passage between said combustion chamber and said further tube, a casing formed with inlet and outlet openings and enclosing said element, means for igniting fuel within said combustion chamber, a valve for preventing all flow through said further tube and heat exchange element, said valve being interposed between said combustion chamber and carbureter, whereby the vacuum created by the motor and transmitted through the further tube will—with the valve closed—extend through the combustion chamber to thereby assist in the ready ignition of the combustible mixture within the same as said valve is opened, said valve comprising a seat presenting an opening, a body movable towards and away from said seat, and a tapered and reduced end portion extending in guiding relationship and in contact with the edges of the opening formed in the seat.

4. A heating apparatus for application to a motor vehicle and including in combination, a tube to be connected to the fuel supply pipe of the automobile, a further tube to be connected to the intake manifold of the automobile engine, a carbureter connected to said first named tube, means providing a combustion chamber coupled to said carbureter, a heat exchange element providing a passage between said combustion chamber and said further tube, a casing formed with inlet and outlet openings, and enclosing said element, means for igniting fuel within said combustion chamber, a valve for preventing all flow through said further tube and heat exchange element, said valve being interposed between said combustion chamber and carbureter, whereby the vacuum created by the motor and transmitted through the further tube will—with the valve closed—extend through the combustion chamber to thereby assist in the ready ignition of the combustible mixture within the same as said valve is opened, the inlet opening of the casing being adapted to be coupled to the fluid cooling system of the automobile engine and a unit heater coupled to the outlet opening of said casing and to receive heated fluid.

5. A heating apparatus including a pair of tubes to be connected respectively to the fuel supply pipe and intake manifold of an internal combustion motor, a carbureter connected to one of said tubes, a combustion chamber connected to said carbureter, a heat exchange tube coupled to said combustion chamber, a casing enclosing said latter tube and formed with inlet and outlet openings through which fluid is to flow, and a valve assembly connecting said last named tube to the second of said pair of tubes, said assembly including a further casing, a valve within said casing and when seated interrupting the flow of fluid through said tubes, a fusible ring supported by said further casing and below said valve to normally prevent the latter from seating until a pre-determined temperature has been exceeded, and said valve and ring being completely enclosed within said further casing whereby said valve and ring are inaccessible from the exterior of said casing.

6. A heating apparatus for application to a motor vehicle and including in combination, a tube to be connected to the fuel supply pipe of the automobile, a further tube to be connected to the intake manifold of the automobile engine, a carbureter connected to said first named tube, means providing a combustion chamber coupled to said carburetor, a heat exchange element providing a passage between said combustion chamber and said further tube, a casing formed with inlet and outlet openings and enclosing said element, means for igniting fuel within said combustion chamber, a valve for preventing all flow through said further tube and heat exchange element, said valve being interposed between said combustion chamber and carburetor whereby the vacuum created by the motor and transmitted through the further tube will—with the valve closed—extend through the combustion chamber to thereby assist in the ready ignition of the combustible mixture within the same as said valve is opened, and means for causing a circulation of fluid to be heated through said casing and from the inlet to the outlet openings thereof.

7. A heating apparatus for application to a motor vehicle and including in combination, a tube to be connected to the fuel supply pipe of the automobile, a further tube to be connected to the intake manifold of the automobile engine, a carburetor connected to said first named tube, means providing a combustion chamber coupled to said carburetor, an additional tube forming a heat exchange element and extending downwardly from and connected to said chamber, a casing enclosing said additional tube and formed with inlet and outlet openings, means for igniting fuel within said combustion chamber, said additional tube being arranged out of contact with said casing and unsupported between the inlet and outlet openings thereof, a valve for preventing all flow through said further tube and heat exchange element, said valve being interposed between said combustion chamber and carburetor whereby the vacuum created by the motor and transmitted through the additional tube will—with the valve closed—extend through the combustion chamber and carburetor to thereby assist in the ready ignition of the combustible mixture within the same as said valve is opened, and means for causing a flow of fluid to be heated through said casing and from the inlet to the outlet opening of the same.

8. A heating apparatus for application to a motor vehicle and including in combination, a tube to be connected to the fuel supply pipe of the automobile, a further tube to be connected to the intake manifold of the automobile engine, a carburetor connected to said first named tube, means providing a combustion chamber coupled to said carburetor, a heat exchange element providing a passage between said combustion chamber and said further tube, a casing formed with inlet and outlet openings and enclosing said element, means for igniting fuel within said combustion chamber, a valve for preventing all flow through said further tube and heat exchange element, said valve being interposed between said combustion chamber and carburetor, whereby the vacuum created by the motor and transmitted through the further tube will—with the valve closed—extend through the combustion chamber to thereby assist in the ready ignition of the combustible mixture within the same as said valve is opened, resilient means coupled to said valve actuating means whereby the latter acts to bias said valve to opened and closed positions, and means for causing a circulation of fluid to be heated through said casing and from the inlet to the outlet openings thereof.

9. A heating apparatus for application to a motor vehicle and including in combination, a tube to be connected to the fuel supply pipe of the automobile, a further tube to be connected to the intake manifold of the automobile engine, a carburetor connected to said first named tube, means providing a combustion chamber coupled to said carburetor, a heat exchange element providing a passage between said combustion chamber and said further tube, a casing formed with inlet and outlet openings and enclosing said element, means for igniting fuel within said combustion chamber, a valve for preventing all flow through said further tube and heat exchange element, said valve being interposed between said combustion chamber and carburetor whereby the vacuum created by the motor and transmitted through the further tube will—with the valve closed—extend through the combustion chamber to thereby assist in the ready ignition of the combustible mixture within the same as said valve is opened, all of such apparatus being disposed in advance of the dash of said motor vehicle and within the engine compartment thereof, air distributing means disposed within the passenger compartment of said vehicle, and conduits extending through the dash to the inlet opening of said casing and from said air distributing means to the outlet opening of said casing.

10. A heating apparatus for application to a motor vehicle and including in combination, a tube to be connected to the fuel supply pipe of the automobile, a further tube to be connected to the intake manifold of the automobile engine, a carburetor connected to said first named tube, means providing a combustion chamber coupled to said carburetor, a heat exchange element providing a passage between said combustion chamber and said further tube, a casing formed with inlet and outlet openings, and enclosing said element and combustion chamber, means connected to said combustion chamber and extending downwardly therefrom to provide a recess, heat generating means positioned within said recess and serving to ignite the fuel within the same and within said combustion chamber, the fuel mixture flowing from said carburetor resulting—with the parts of the apparatus cold—in fuel particles depositing within said recess being vaporized by said heating means and thereupon being ignited, and a valve for preventing all flow through said further tube and heat exchange element, said valve being interposed between said combustion chamber and carburetor, whereby the vacuum created by the motor and transmitted through the further tube will—with the valve closed—extend through the combustion chamber to thereby assist in the ready ignition of the combustible mixture within the same as said valve is opened.

11. A heating apparatus for application to a motor vehicle and including in combination, a tube to be connected to the fuel supply pipe of the automobile, a further tube to be connected to the intake manifold of the automobile engine, a carburetor connected to said first named tube, means providing a combustion chamber coupled to said carburetor, a heat exchange element providing a passage between said combustion chamber and said further tube, a casing formed with inlet and outlet openings, and enclosing said element and combustion chamber, means for igniting fuel within said combustion chamber, porous surfaces associated with said chamber and whereby a fuel mixture flowing from said carburetor through said combustion chamber—and with the parts of the apparatus in cold condition—will have its particles deposit upon and saturate such surfaces, said igniting means subsequently causing an ignition of certain of said fuel particles, and a valve for preventing all flow through said further tube and heat exchange element, said valve being interposed between said combustion chamber and carburetor, whereby the vacuum created by the motor and transmitted through the further tube will—with the valve closed—extend through the combustion chamber to thereby assist in the ready ignition of the combustible mixture within the same as said valve is opened.

CARL E. MEYERHOEFER.